Aug. 19, 1941.   B. G. CARLSON   2,252,757
AIR PUMP
Filed Sept. 10, 1938
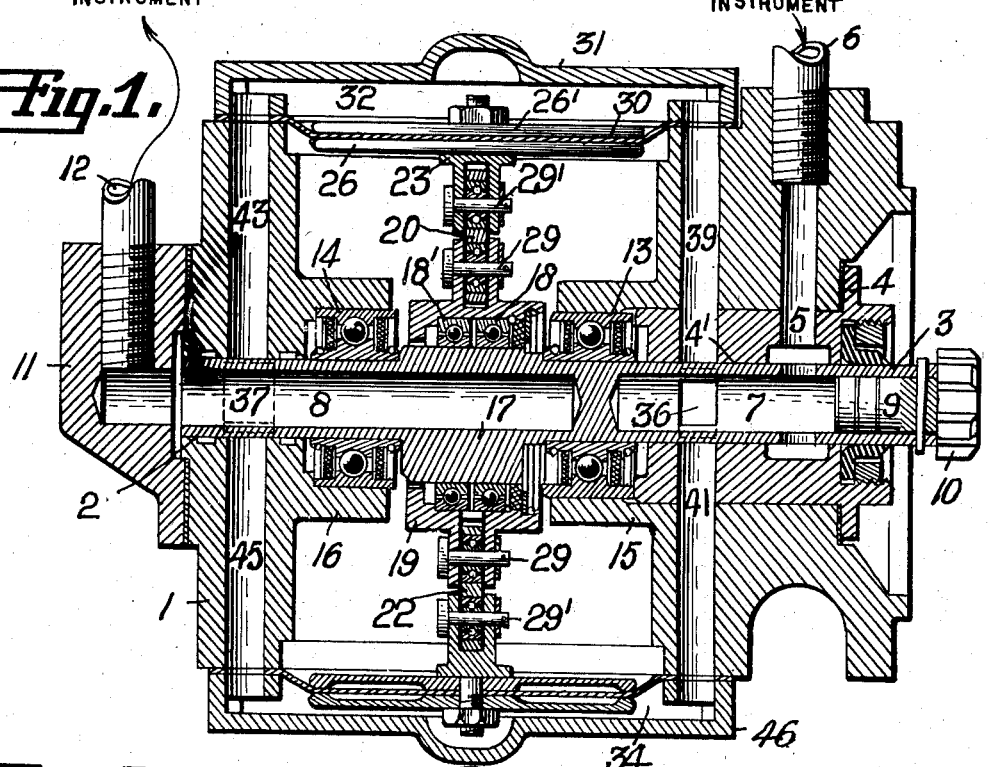
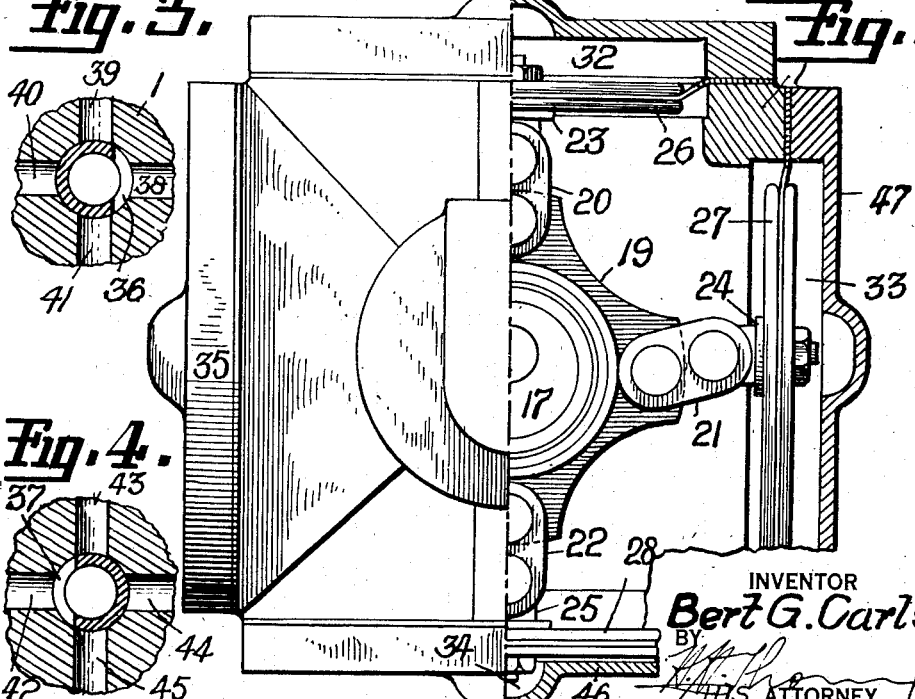
INVENTOR
Bert G. Carlson
BY
HIS ATTORNEY Patented Aug. 19, 1941

2,252,757

UNITED STATES PATENT OFFICE 2,252,757

AIR PUMP

Bert G. Carlson, Freeport, N. Y., assignor to Sperry Gyroscope Company, Inc., Brooklyn, N. Y., a corporation of New York Application September 10, 1938, Serial No. 229,265

5 Claims. (Cl. 230—170)

This invention relates to improvements in machines for compressing and/or circulating air or other gaseous substances.

One object of the invention is to provide means for preventing dust and other foreign matter from entering delicate apparatus such as aircraft instruments, which are driven by positive or negative air pressure. An ordinary pump will either suck air in from the outside, compress it and deliver it to the instruments to be driven, from where it is discharged to the atmosphere, or it will suck air through the instruments into the pump and discharge it to the outside from the pump directly. In either case, atmospheric air is constantly passed through the instruments and all impurities such as dust, water and the like, which are not stopped by individual filters which may be provided, will cause damage to the delicate bearings and pivots or other sensitive parts of the instruments. Also, in the case of a positive pressure pump of ordinary design oil from the pistons and cylinder walls is likely to enter the air stream and gum up the delicate driven instruments.

The present invention provides a pump which circulates the same air over and over again through the instruments by having the intake of the pump connected to one side of the instruments, while the discharge end of the pump is connected to the other side of the instruments. Furthermore, the pump itself is entirely closed against the outside atmosphere, and has no reciprocating sliding pistons requiring oiling, so that once the air contained in the closed system is clean, no impurities can enter.

A preferred embodiment of this invention is a multi-diaphragm pump with a novel arrangement of automatically operated valves. Diaphragm pumps are old and well known in the art, but the particular simple and novel valve arrangement embodied in this invention is a distinct advantage over other known pumps of similar nature.

In the drawing,

Fig. 1 represents a vertical cross section through my pump.

Fig. 2 is a horizontal cross section through the same pump, but turned 90°.

Figs. 3 and 4 show the operation of the automatic valve.

In Fig. 1, 1 is a housing having an aperture 2 for one end of the pump shaft 3. The other end of shaft 3 projects through a stuffing box 4, which is provided with air passages 5 into which air or gas may enter from the pipe 6. The shaft 3 is hollowed out at both ends, forming recesses 7 and 8 inside of the shaft. The recess 7 is closed by a plug 9 pinned to the shaft and having at its outer ends splines 10, by means of which the pump may be connected to a drive shaft rotated by any suitable prime mover. The recess 8 of the hollow shaft 3, by means of the end cap 11, is connected to the pipe 12 through which the compressed air is led to or from the driven instruments.

The shaft 3 is provided with two ball bearings 13 and 14 located in two projections 15 and 16 of the housing 1. These ball bearings are accurately lined up with the apertures 2 and 4' for the shaft 3 and their purpose is to absorb the load imposed on the shaft when in operation. An eccentric section of the shaft 3 is located between the two bearings at 17 (also shown in Fig. 2) and carries two ball bearings 18 and 18' so as to allow the actuator 19 to rotate freely on the eccentric section 17.

Four links, of which links 20, 21 and 22 are shown, are connected to the actuator 19 and to the diaphragm holders 23, 24 and 25 in such a way as to impart to the plates 26, 27 and 28 a reciprocating motion if the shaft 3 is rotated. Ball bearings seated on studs 29 and 29' serve the purpose of decreasing friction as much as possible. Between plates 26 and 26', as well as between the corresponding plates of the other three pump sections, is clamped a diaphragm 30 of fibrous or other suitable flexible material, the outer edge of which is clamped under a cap 31 so that a limited amount of motion of the plates 26 and 26' is possible. A similar arrangement of diaphragms is provided for the other three sections of the pump. Between the diaphragm 30 and the cap 31 there is an enclosed air space 32 corresponding to air spaces 33 and 34, as shown in Fig. 2.

If the shaft 3 is rotated, the air content in the spaces 32, 33 and 34, and in the fourth air space inside of cap 35 is periodically decreased and increased, constituting a pump action. If, now, as shown in the drawing, the shaft 3 is rotated in a direction to move the visible part of the splines 10 upwardly, which would correspond to a clockwise motion of the shaft as shown in Fig. 2, the air space 34 is increased while the air space 32 is being decreased at the same time. Similarly, the air space 33 decreases while the space under cap 35 (Fig. 2) is increasing.

It is necessary to allow air to enter those air spaces which are increasing and to allow air to escape from those air spaces which are decreasing. A valve arrangement is provided to allow this. The shaft 3 acts as a valve while it rotates. The shaft is provided with a sectional opening 36 at the right hand end of the shaft and with an opening 37, shown in dotted lines, at the left hand of the shaft. The opening 37 is towards the observer. Each of the openings 36 and 37, in turn, is connected with four air passages located in the housing 1, as shown in Figs. 3 and 4 in greater detail. In the present position of the pump, the cut-out 36 of the shaft 3 is connected to an air passage 38, while the passages 39, 40 and 41 are closed. The cut-out 37, in the momentary position of the pump, is connected to the air passage 42, while the passages 43, 44 and 45 are closed. The passages 43 and 39 are both connected to the air chamber 32 on top of the diaphragm 30, while the air passages 45 and 41 are both connected to the air chamber 34. Similarly, the passages 40 and 42 are both connected to the air chamber contained in cap 35, while the passages 38 and 44 are connected to the air chamber 33. It therefore is evident that as the pump shaft is revolved in a clockwise direction, the air is being sucked into chamber 33 through air passage 38, cut-out 36, hollow shaft 7 and air passages 5 and 6. At the same time the air is being compressed in the chamber under cap 35 and escapes through passage 42, cut-out 37 and pipe 12. After rotating 90°, the air chamber 33 has moved toward air passage 41, closing the air passage 38. Further revolving of the shaft will start compression of the air in chamber 33, which will find a gradually opening passage through passage 44 and cut-out 37 which also has moved 90°, to tube 12. Identical action takes place on the other two diaphragms of the pump, the air passages being closed off and opened in cyclic sequence by means of the cut-outs 36 and 37 revolving with the shaft.

It is evident that this arrangement constitutes a very simple and at the same time extremely efficient valve operation which is a great improvement over the valves of the poppet type or of the flap type, where great loss of air is experienced due to the time element involved in opening and closing of the valves. Also, the just mentioned types of valves, like others, are passive in action, being operated indirectly by suction or pressure, while the valve arrangement of the present invention is absolutely positive and can never lag or lead or become inoperative due to sticking of valve parts. In actual operation, the pump is revolved at a suitable speed and gives a delivery of remarkably smooth performance, the familiar "pounding" of air pumps being completely absent from this design. This must be attributed to the particular action of the valve cut-outs in the shaft which automatically adjust their opening to the requirements of the instantaneous position of the diaphragm. The diaphragms move in substantially harmonic motion and the cut-outs 36 and 37, being rotated at the frequency of the harmonic motion of the diaphragms at any given instant, provide correct valve opening to allow unimpeded passage of just the right amount of air to provide substantially constant pressure at the output pipe 12.

It can be seen from the drawings that the pump is completely enclosed and that atmospheric air cannot get into the air chambers, as the closing caps 31, 35, 46 and 47 are sealed by means of gaskets. These gaskets are integral with the diaphragms so that by just clamping the caps onto the diaphragm, a hermetic seal is provided.

In order to keep the drawings and specification simple, screws, nuts and other means to keep the assembly together and to hold down the caps and other parts have been omitted.

It should also be noted that the air flows through the pump without coming in contact at any time with any oiled surfaces. Both the ball bearings 13 and 14 for the shaft 3 and the bearings 18 and 18' around the cam member 19 are in the interior of the hollow casing, which merely comprises a dead air space. The intake air, however, enters through one end of the hollow shaft, passes through separate air passages 38 to the proper pump chamber, out again to the other air passages, and thence through the other end of the hollow shaft, all without passing over or coming in contact with any oiled surfaces, there being sufficient clearance between the shaft 3 and the casing at both ends not to require lubrication. In this manner, no oil fumes enter the circulatory air system.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a multi-diaphragm air pump, a housing, a hollow shaft journaled in said housing, a plurality of chambers concentrically arranged around said shaft, a diaphragm forming one wall of each chamber, means driven by said shaft and adapted to impart reciprocating substantially harmonic motion to said diaphragms, and a plurality of rotary valves forming integral parts of said shaft and adapted to alternately release and restrain the flow of air compressed by said diaphragms, said valves having openings automatically varying substantially in accordance with said harmonic motion as the shaft is turned.

2. In a constant pressure pump for compressing and recirculating air for air driven instruments, intake and exhaust ports, at least four symmetrically arranged compression chambers, means to periodically vary the volume of said chambers, a concentric shaft to drive said means and having tubular portions at each end, means connecting said tubular portions to one each of said ports, a valve aperture in each of said tubular portions of said shaft, a plurality of passages connected to said chambers and adapted to be automatically opened and closed in predetermined sequence and period by said shaft and said apertures, respectively, as said shaft turns, and bearings for said shaft inside of said ports and apertures whereby circulating air passes over no oiled surfaces.

3. In a closed circuit air pump for air driven instruments, a housing, intake and exhaust ports in opposite ends of said housing, a plurality of pump chambers, membrane means to periodically vary the volume of said chambers, a shaft to drive said means, intake and exhaust passages to and from said chambers both of which are adapted to be connected to said instruments and which terminate in said ports, and valve means integral with said shaft and connected to said ports, said valve means being adapted sequentially and alternately to connect said passages to said ports in synchronism with said volume variations as said shaft turns.

4. In a closed circuit air pump, a hollow casing, a plurality of reciprocating diaphragms arranged around an axis therein and acting outwardly against the outer walls of the casing, a hollow rotary shaft extending along said axis, centrally located means on said shaft within said casing for sequentially reciprocating said diaphragms, lubricated bearings for said shaft and said means on the interior of said casing, intake and distributing ports adjacent one end of said shaft and outlet and distributing ports adjacent the opposite end of said shaft, all said ports being outside of said casing, whereby the incoming and outgoing air passes over no oiled surfaces.

5. In a multi-diaphragm air pump having intake and exhaust ports and a plurality of radially arranged compression chambers, a central shaft to oscillate said diaphragms, a hollow section at each end of said shaft, each section having a cut-out forming a rotary valve and means to interconnect said ports with said hollow sections, said valves operating to successively interconnect each of said compression chambers alternately and successively to each of said hollow sections as said shaft turns, and lubricated bearings for said shaft spaced from each end beyond said ports so that the circulating air does not pass thereover.

BERT G. CARLSON.